(12) United States Patent
Ziskind et al.

(10) Patent No.: US 8,774,831 B2
(45) Date of Patent: Jul. 8, 2014

(54) DATABASE SEEDING WITH LOCATION INFORMATION FOR WIRELESS ACCESS POINTS

(75) Inventors: Russell Ziskind, Webster, NY (US); Chris McKechney, Marion, NY (US); Jeffrey Seaman, Rochester, NY (US); Ankur Patel, South River, NJ (US); Brandon Pastuszek, Orlando, FL (US); Joseph Impellizzieri, Fairport, NY (US); Samuel Gottfried, Brooklyn, NY (US)

(73) Assignee: ZOS Communications, LLC, Webster, NY (US)

( * ) Notice: Subject to any disclaimer, the term of this patent is extended or adjusted under 35 U.S.C. 154(b) by 244 days.

(21) Appl. No.: 13/531,403

(22) Filed: Jun. 22, 2012

(65) Prior Publication Data

US 2013/0165144 A1 Jun. 27, 2013

Related U.S. Application Data

(60) Provisional application No. 61/501,094, filed on Jun. 24, 2011.

(51) Int. Cl.
*H04W 24/00* (2009.01)

(52) U.S. Cl.
USPC ...................................... 455/456.1

(58) Field of Classification Search
USPC ...................................... 455/456.1
See application file for complete search history.

(56) References Cited

U.S. PATENT DOCUMENTS

| | | | |
|---|---|---|---|
| 2003/0063589 A1 | 4/2003 | Haines et al. | |
| 2007/0004428 A1 | 1/2007 | Morgan et al. | |
| 2009/0280827 A1* | 11/2009 | Michaud | 455/456.1 |
| 2011/0117924 A1 | 5/2011 | Brunner et al. | |

* cited by examiner

*Primary Examiner* — Joel Ajayi
(74) *Attorney, Agent, or Firm* — Baker & Hostetler LLP

(57) ABSTRACT

A query device scans radio frequencies for visible transmitting devices. The querying device receives at least a signal strength and identifier information associated with each of the transmitting devices. The list of visible devices is used to query a database containing location information for a plurality of visible devices. The list may be sent to a locationing system that may perform a location analysis on the resulting data to return a location to the query device. The weighted average of the locations returned in the database query may be computed to determine the location of the querying device, with the weight for each of the locations being the current signal strength detected by the querying device. Neural network analysis may also be used to determine the location of the querying device. Learning and seeding operations many also be used to populate the database with location information for transmitting devices.

10 Claims, 11 Drawing Sheets

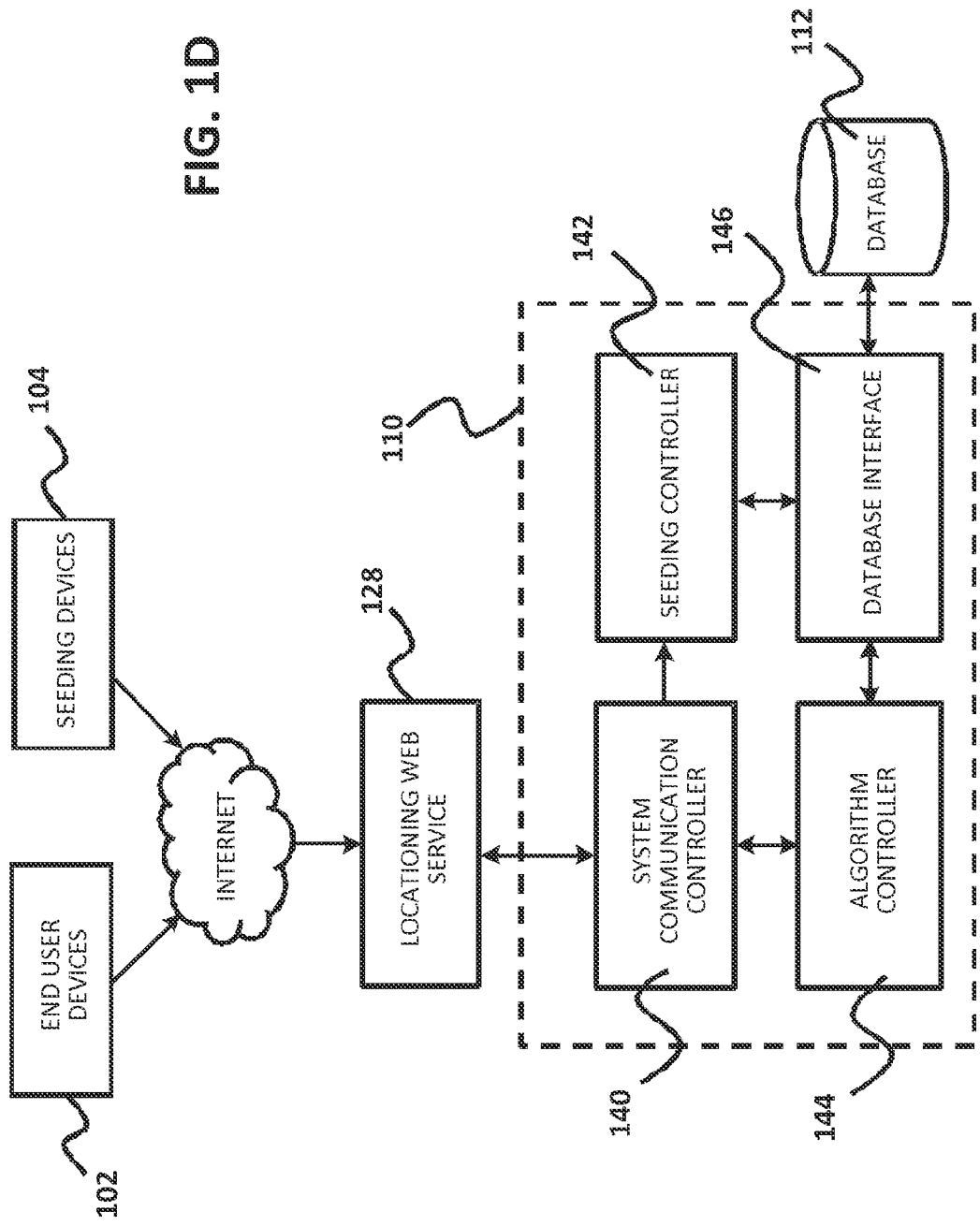

DATABASE SEEDING WITH LOCATION INFORMATION FOR WIRELESS ACCESS POINTS

CROSS REFERENCE TO RELATED APPLICATIONS

This application claims priority from U.S. Provisional Application No. 61/501,094, filed Jun. 24, 2011, which is incorporated herein by reference in its entirety.

BRIEF DESCRIPTION

Embodiments are directed to a method of determining the location of a device, having at least a wireless function, using a weighted average analysis and/or a pattern recognition analysis. From herein, the device whose location is determined using the weighted average analysis and/or the pattern recognition analysis will be referred to as the "querying device."

In an embodiment, a querying device may scan wireless channels for wireless access points (WAPs) visible within the wireless range of the querying device. The querying device may receive at least a signal strength and identifier information associated with each of the WAPs. Such identifier information may include the MAC address of the WAP, the service set identifier (SSID) of the WAP, a combination of the MAC address and the SSID, or some other unique identifier of the WAP. The list of visible WAPs may be used to query a database containing location point information for a plurality of WAPs. If a WAP detected by the querying device is in the database, then the location point of that WAP may be returned to the locationing system. The location points for all WAPs found by the query to the database may then be used by the locationing system to compute the location of the querying device, which may be returned to the querying device. In an embodiment, the weighted average of the location points returned in the database query may be computed to determine the location of the querying device, with the weight for each of the location points being the current signal strength detected by the querying device.

An embodiment may be directed to using a pattern recognition algorithm to determine the location of a querying device. In the embodiment, the pattern recognition algorithm may be trained with the database of WAP information. The pattern recognition algorithm has a number of inputs at least equal to the number of WAPs for which data may be available in the database. If there is data for three WAPs in the database, then the pattern recognition algorithm would have at least three inputs. The number of outputs of the pattern recognition algorithm may be equal to the number of possible regions within which the querying device can be located. If the querying device can be in one of three possible regions, then the number of outputs of the pattern recognition algorithm would be three.

The pattern recognition algorithm may be trained with signal strength readings, to allow the pattern recognition algorithm to develop an association between particular combinations of signal strengths of WAPs and regions. After the pattern recognition has been trained, the pattern recognition algorithm may receive, as inputs, current signal strength readings, and may provide, as an output, the region where the querying device may be located. Embodiments may use neural networks, classifier systems, clustering algorithms, etc.

BACKGROUND

As discussed in U.S. Patent Application Publication No. US2007/0004428 A1, rudimentary weighted averages formulas have been used to calculate wireless access point locations. In systems employing such formulas, individuals voluntarily supply the data required by systems, which presents a number of problem. Some of data may be new while other data could be years old. Since access point locations can change, this is problematic. The data may be inconsistent since each querying device uses different hardware and software configurations, each radio antenna has different signal reception characteristics affecting the representation of the strength of the signal, and scanning software implementations may scan for wireless signals in different ways at different times. Data may aggregate around heavily traffic areas resulting in arterial bias. Each database may calculate access point locations differently and with different weighted average formulas. As a result, many access points may not be correctly located.

As discussed in U.S. Patent Application Publication No. US2009/0280827 A1, neural networks have also been used to match scaled signal strengths of wireless access points measured by a device to records of signal strengths of wireless access points.

BRIEF DESCRIPTION OF THE DRAWINGS

FIG. 1D illustrates an alternative system architecture of an embodiment of the system disclosed herein and to seed a database with location readings.

DETAILED DESCRIPTION OF ILLUSTRATIVE EMBODIMENTS

Figure 1A:
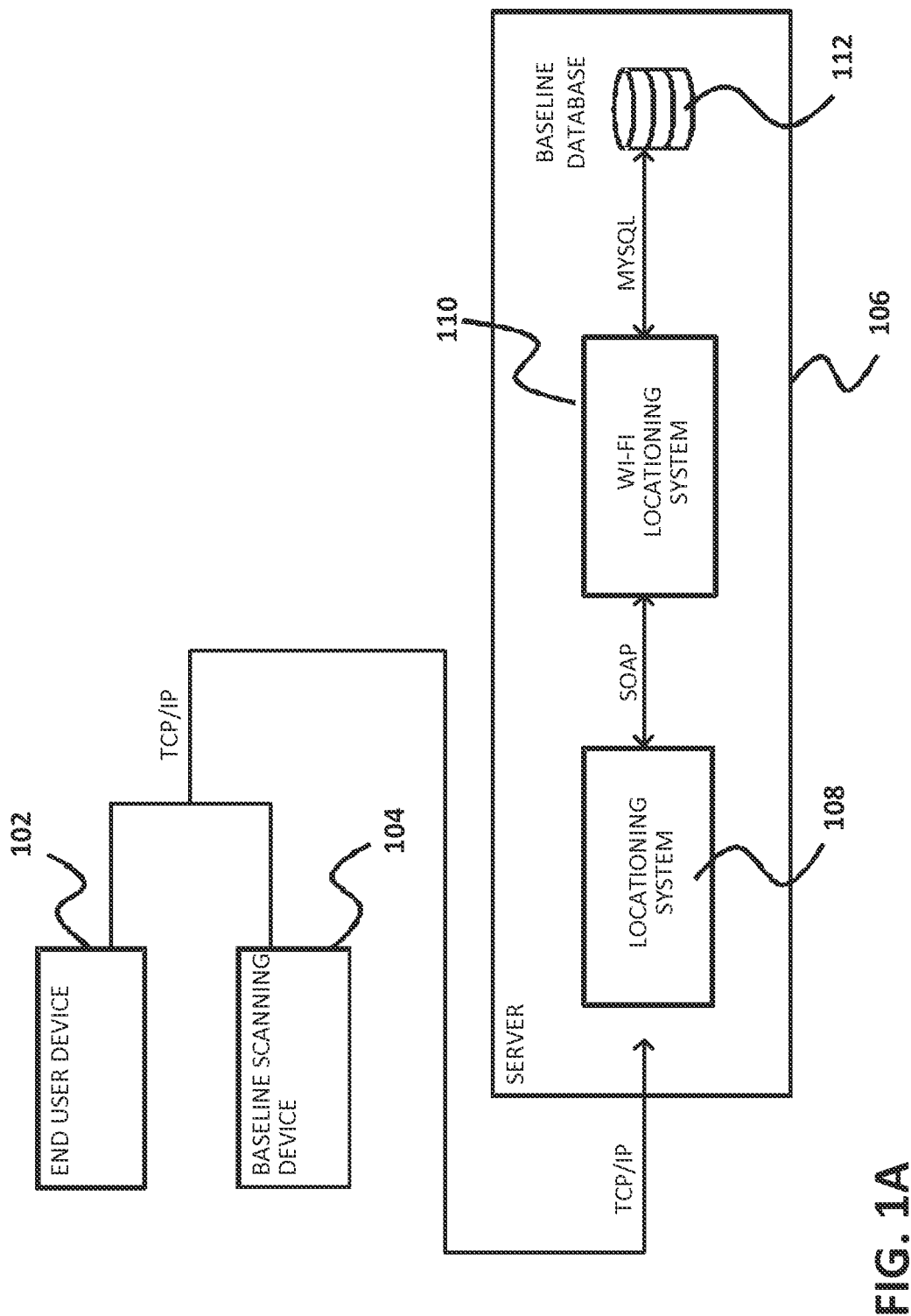
FIG. 1A illustrates an architecture of an embodiment of the system disclosed herein.

FIG. 1A illustrates an architecture of an embodiment of the system disclosed herein. The architecture may use one or more end-user devices 102 (querying devices) and one or more baseline scanning devices 104 that may communicate via a TCP/IP connection with a server 106. The server 106 may host a locationing system 108, a Wi-Fi locationing system 110, and a database 112. The terms "baseline scanning device" and "seeding device" may refer to any mobile, wireless or other device used to seed the baseline database 112 with location readings and signal strength readings for wireless access points (WAPs). The terms "end-user device" and "querying device" may refer to any mobile, wireless or other device that queries the baseline database 112 to determine the location of the device. Both querying devices and seeding devices may communicate with the server 106 via alternative communication protocols instead of TCP/IP.

The locationing system 108 may handle communication with the end-user device 102 and the baseline scanning device 104. The locationing system 108 may communicate with the Wi-Fi locationing system 110 via Simple Object Access Protocol (SOAP) calls to at least (1) request the location of end-user device 102; and (2) store location readings and signal strength readings, received from end-user device 102 and scanning device 104, in database 112 in order to continuously and organically grow the database 112. The Wi-Fi locationing system 110 may include logic to either determine the location of end-user device 102 using a weighted average analysis, a pattern recognition analysis, or using a combination of both the weighted average analysis and the pattern recognition analysis. Such logic may be stored on non transitory, non transient, or computer readable storage media. As used herein computer readable storage media may comprise any disk or drive configured for the storage of machine readable information and may include floppy disks, CDs, DVDs, optical storage, magnetic drives, solid state drives, hard drives, or any other memory device known in the art. Both of these methods may use the same database 112, or alternatively may use different databases. The database may be used by the Wi-Fi locationing system 110 to at least compute the location of end-user devices. The database includes location readings, signal strength readings, identification information for a plurality of WAPs, and other data associated with WAPs.

While FIG. 1A illustrates the use of SOAP calls, alternative embodiments can use other protocols for the communication between the locationing system 108 and the Wi-Fi Location locationing system 110. In addition, FIG. 1A illustrates the use of a MySQL database, but any other relational database management system can be used. Examples of other relational database management systems include SQLite, MICROSOFT ACCESS, PostgreSQL, FIREBIRD, etc.

The locationing system 108 and the Wi-Fi locationing system 110 need not be separate systems. In one embodiment, the locationing system 110 and the Wi-Fi locationing system 112 may be integrated into a single system that may interact with the end-user device 102 and the seeding device 104, add location readings to database 112, determine the locations of wireless access points based on location readings gathered by devices 102 and 104, query the database to retrieve location readings and other data, perform the weighted average analysis and the pattern recognition analysis, etc. The locationing system 108 and/or the Wi-Fi locationing system 110 may be located locally on the end-user device 102 and/or baseline scanning device 104. Alternatively, the locationing system 108 and/or the Wi-Fi locationing system 110 may be located remotely on a server 106, as illustrated in FIG. 1A. The locationing system 108, the Wi-Fi locationing system 110, and the database 112 may also be hosted in two or more separate servers.

It is to be understood that embodiments described herein are described using wireless access points and wireless devices. However, alternative embodiments may use other types of transmitter and receiver devices without departing from the spirit of the disclosure, such as near field communication (NFC) and radio-frequency identification (RFID).

Figure 1B:
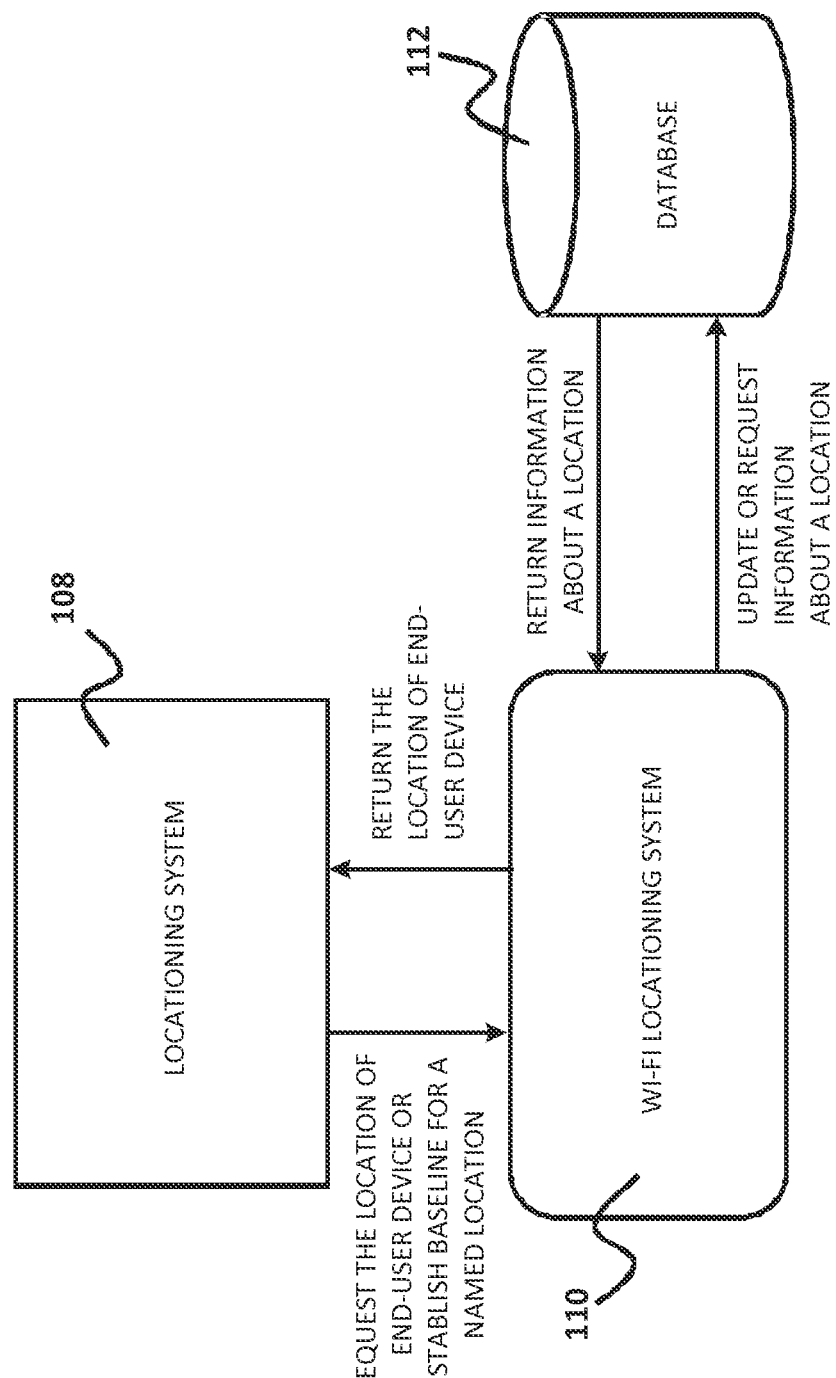
FIG. 1B further illustrates relationships between the locationing system, the Wi-Fi locationing system, and the database of FIG. 1A.

FIG. 1B is a high level diagram illustrating further in detail the relationships between the locationing system 108, the Wi-Fi locationing system 110, and the database 112, in accordance with an embodiment. The locationing system 108 may request the location of end-user device 102 or establish a baseline for a named location (such as a WAP). The Wi-Fi locationing system 110 may update or request information about a particular location, such as a particular WAP or region. The database 112 may return information about the queried location, but may also return results to any other query submitted by the Wi-Fi locationing system 110. The Wi-Fi locationing system 110 may use the information from the database 112 to determine the location of end-user device 102, and may return this location to the locationing system 108. As indicated above, the functions of the locationing system 108 and the Wi-Fi locationing system 110 may be combined into a single system that may perform the functions of communicating with end-user device 102 and scanning device 104, while also managing the weighted average analysis, the pattern recognition analysis, and the interface with the database.

Figure 1C:
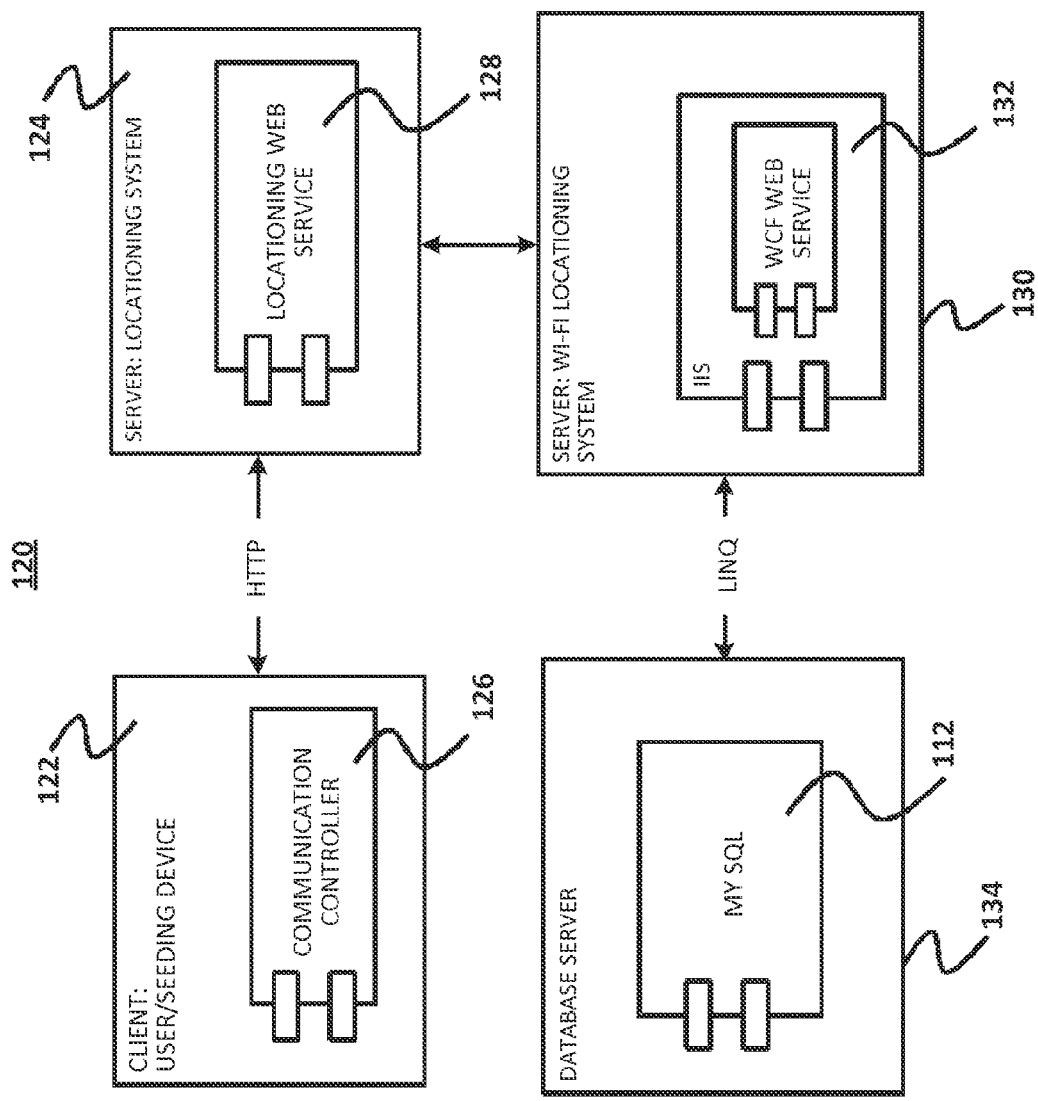
FIG. 1C illustrates a deployment diagram 120 of the system from FIG. 1A.

FIG. 1C illustrates a deployment diagram 120 of the system from FIG. 1A in accordance with an embodiment. A deployment diagram may model the physical deployment of software components in hardware components, and how the different components may be connected. Specifically, the deployment diagram 120 may illustrate a client-server architecture, where the client 122 (end-user device 102 or seeding device 104) may communicate with a locationing system server 124. The client 122 may use a communication controller 126 hosted on the client 122 to communicate with the locationing web service 128 hosted on locationing system server 124. The locationing web service 128 may implement the functionality of locationing system 108. The communication controller 126 may allow for the transmission of Wi-Fi data, GPS data, sensor data, and other location data from end-user device 102 and scanning device 104.

The locationing web service 128 may relay Wi-Fi data, sensor data, and other location data to the Wi-Fi locationing system 110, which may be hosted on Wi-Fi locationing system server 130. For example, location readings and signal strength readings may be communicated to the Wi-Fi locationing system server 130 to store in the database or to determine the location of end-user device 102.

The Wi-Fi locationing system server 130 may host a Windows Communication Foundation (WCF) web service 132 serving as the main entry point into the Wi-Fi locationing system 110. WCF web service 132 may relay end-user location and seeding requests to the appropriate subsystem, including the weighted average analysis, the pattern recognition analysis, and the interface to the database 112. Database server 134 may host database 112. It is to be understood that the use of a WCF service that is hosted in Internet Information Services (IIS) is presented as an example in accordance with an embodiment, as any other framework or implementation of a client-server application or a service-oriented application may be used.

FIG. 1D illustrates an alternative system architecture of a system used to determine the locations of devices and to seed a database with location readings. As shown in FIG. 1D, end-user device 102 and seeding device 104 may communicate via an Internet connection to the locationing web service 128 of locationing system 108. The Wi-Fi locationing system 110 may be implemented by four elements: system communication controller 140, seeding controller 142, algorithm controller 144, and database interface 146. The system communication controller 140 may control execution of the Wi-Fi locationing system 110 by (1) invoking the seeding controller 142 when end-user device 102 or seeding device 104 provide location readings for an existing location or for a new location, and (2) invoking the algorithm controller when end-user device 102 makes a location request. The system communication controller 140 may also invoke the algorithm controller or system 144 to estimate the location of WAPs based on seeding data provided by seeding devices 104.

In an embodiment, an administrator may be provided with access to the various controller modules of Wi-Fi locationing system 110 to configure the behavior of the individual controllers, including system communication controller 140, algorithm controller 144, seeding controller 142, and database interface 146. For instance, the administrator may log in through a graphical interface in order to configure the weighted average analysis, the pattern recognition analysis, and the combination of these two methods. As described in detail below, the weighted average analysis and the pattern recognition analysis may be executed with many variations, and the graphical interface may allow the administrator to configure which of these variations to use. It may also be possible to provide a limited amount of configuration options to the users of the end-user devices 102 and the seeding devices 104. For instance, a user of end-user device may be given the choice to select between the weighted average analysis and the pattern recognition analysis. The users of seeding devices may be given the choice to set the cadence for obtaining location readings (for seeding the database), so as to maximize battery life of the seeding device.

Figure 2:
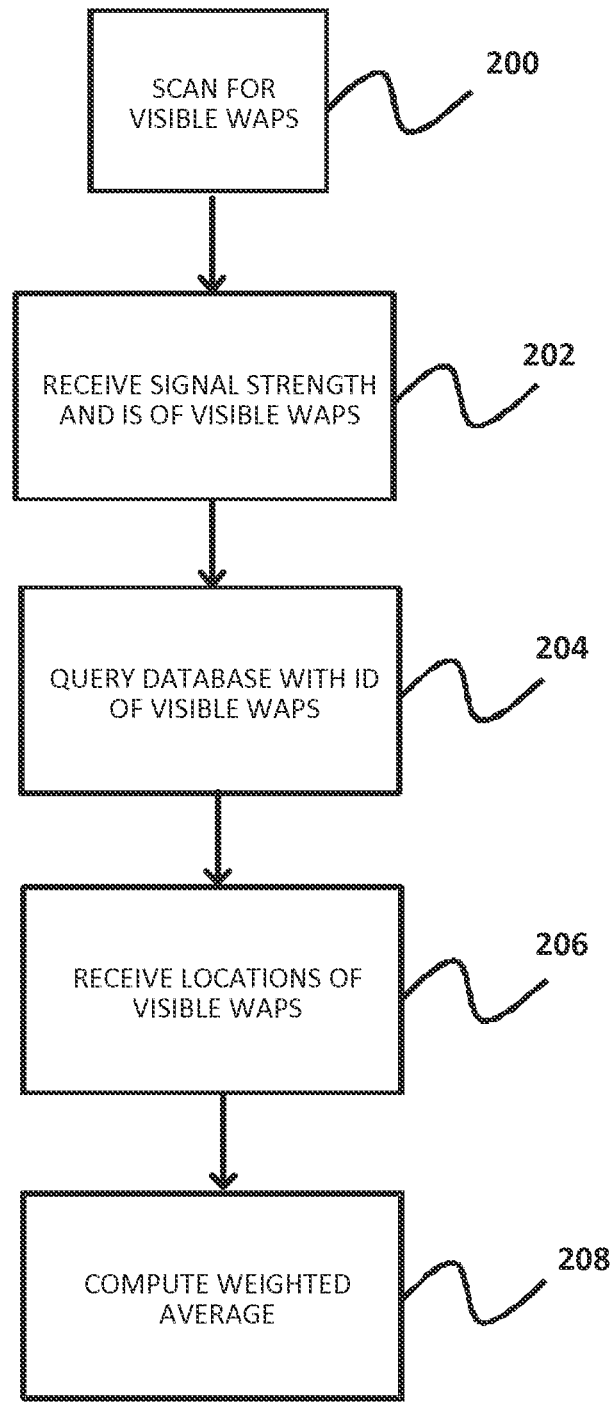
FIG. 2 is a flowchart illustrating an embodiment of steps involved in a weighted average analysis.

FIG. 2 illustrates the main steps involved in the weighted average analysis. In step 200, the querying device may turn on the wireless function (if not already on) and it may scan wireless channels for visible WAPs. For each visible WAP, at least the signal strength and an identifier for the WAP may be recorded in step 202. An identifier for the WAP can include the Service Set Identifier (SSID) or the Media Access Control (MAC) address. In step 204, the database may be queried with the identifiers of the visible WAPs in order to obtain the location point for the visible WAPs. The location points of the visible WAPs may be received as the result of the database query in step 206 and may then be used with the current signal strength readings of the visible WAPs to compute the location of the querying device using a weighted average in step 208. The weighted average may return a location result including the estimated longitude, latitude, and altitude of the device. In an embodiment the location result may consist of only the estimated longitude and latitude, or may consist of a name and a label associated with the location result. For instance, the result may present the resulting location of the querying device as latitude X, longitude Y, and altitude Z, or may present it as "Room D."

Formulas that may be used to calculate the location result from a listing of visible WAPs and their respective signal strengths are set forth below. Let $t1, t2, t3, \ldots,$ to be a total of n access points visible to the querying device. Let "W" represent a WAP, a baseline scanning device, or a querying device for which the location is being estimated. Let $L(W)$ be the longitude of W, let $B(W)$ be the latitude of W, let $A(W)$ be the altitude of W. Let "X" represent an access point visible to a querying device, and let $S(X)$ be the currently detected signal strength of access point X by the querying device. The longitude of the device W is:

$$L(W)=((L(t1)*S(t1))+\ldots+(L(tn)*S(tn))/(S(t1)+\ldots+S(tn))$$

The latitude of the device W is:

$$B(W)=((B(t1)*S(t1))+\ldots+(B(tn)*S(tn)))/(S(t1)+\ldots+S(tn))$$

The altitude of the device W is:

$$A(W)=((A(t1)*S(t1))+\ldots+(A(tn)*S(tn)))/(S(t1)+\ldots+S(tn))$$

The location of the device W can be represented by the triple $(L(W), B(W), A(W))$.

In the weighted average analysis, the locations of the visible WAPs may be averaged, but with the contribution (towards the location calculation) of each visible WAP being dependent on the currently detected signal strength for each visible WAP. The received signal strength indicator (RSSI) may be a measurement of the power present in a received radio signal, and in wireless networking it may be an indication of the power level being received by an antenna. Such analysis, via the hardware/software deployed in a querying device's wireless card, compute the RSSI, which depends on device settings as well as transmission power from the WAP. The received power level, without any obstacles reflecting or blocking the radio signals, may be dependent on the distance between the receiving antenna and the WAP, the radiation pattern of the WAP, the transmitting power of the WAP, and the receiving power of the WAP. However, regardless of the properties of the receiving antenna and of the transmitting WAP, the signal strength may be a strong indicator of the distance between the querying device and the WAP. Both the weighted average analysis and the pattern recognition analysis rely on this assumption to estimate the position of the querying device. If a querying device detects a high signal strength from a first WAP, it may be presumed that the querying device is close to the first WAP. If the same querying device detects a low signal strength from a second WAP at the exact same location, it may be presumed that the querying device is further from the second WAP. In such a case, the coordinates of the first WAP may be weighted higher than the coordinates of the second WAP.

As an example, if a device detects a first WAP with a signal strength of 80%, a second WAP with a signal strength of 40%, and a third WAP with a signal strength of 65%, then the coordinates of the first WAP may be weighted by 0.80, the coordinates of the second WAP may be weighted by 0.40, and the coordinates of the third WAP may be weighted by 0.65.

The received signal strength may also be affected by obstacles between the WAP and the querying device. Such obstacles may include walls, buildings, trees, and other objects which deflect or obstruct radio signals. Obstacles may result in a querying device detecting a low signal strength from a WAP, even if the WAP is relatively close to the querying device. However, it is noted that at any one point, and especially in urban areas where more obstacles are likely to be present, there are likely to be a high number of WAPs that are visible to a querying device. Hence, even if the detected signal strength for a particular WAP is low, the averages of the other visible WAPs may correct for this factor and overall give a good estimate for the position of a querying device.

Figure 3:
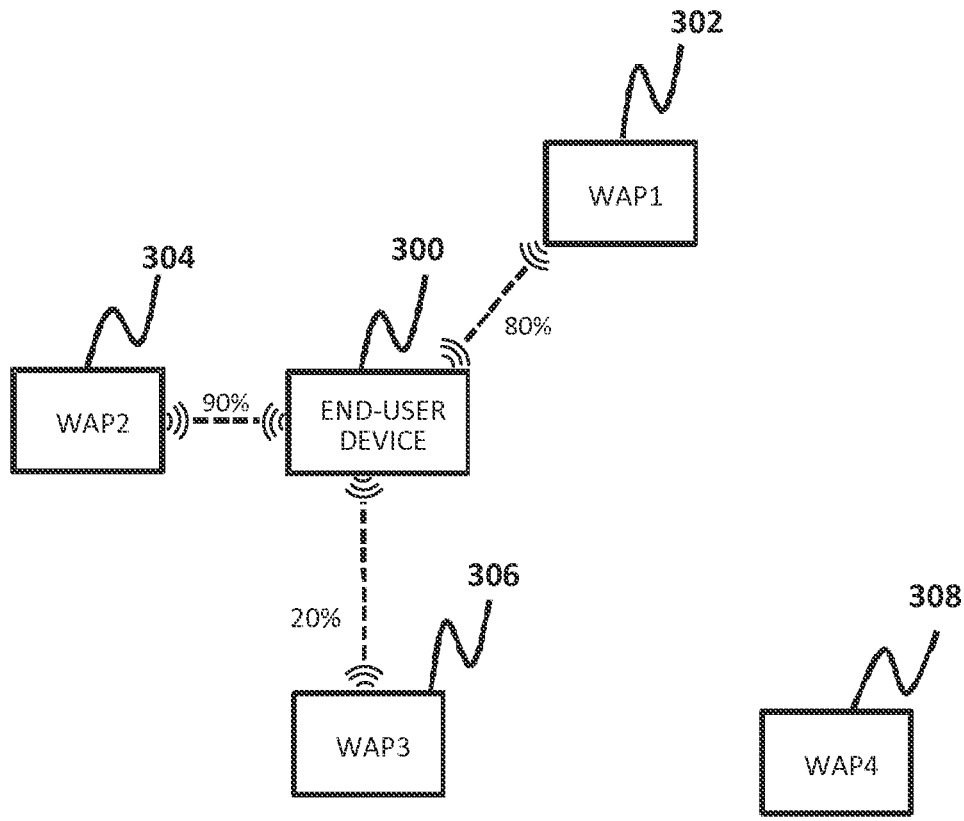
FIG. 3 illustrates a weighted average analysis.

FIG. 3 illustrates an example of how the location for an end-user device 300 may be computed using the weighted average analysis. End-user device 300 may scan wireless channels for visible WAPs in the vicinity of device 300. Device 300 may detect WAP1 302 with a signal strength of 80%, WAP2 304 with a signal strength of 90%, and WAP3 306 with a signal strength of 20%. WAP4 308 is shown as not being visible to device 300 (and hence not detecting a signal strength for WAP4). This may be due to WAP4 being out of range of device 300, or due to an obstacle (such as a building or some other structure) blocking the wireless signals emitted by WAP4 in the direction of device 300. Next, the database with location and signal strength readings, may be queried to obtain the location of WAP1, WAP2, and WAP3. In particular, the SSID, the MAC address or some other identifier for the WAPs may be used to search the database in order to obtain the location of the visible WAPs. The locations of WAP1, WAP2, and WAP3, may then be used to compute the location of end-user device 300 using a weighted average as shown in equation 310. It is also possible for an end-user device to detect a visible WAP for which there is no location information in the database. In such a case, this visible WAP may be discarded from the weighted average computation.

In another embodiment, the weighted average analysis may be varied by using weights relative to a ranking of the signal strengths of the visible WAPs, rather than using the actual signal strength values themselves. For example, the WAP with the highest signal strength may be given a weighted value of 1.0, the WAP with the second highest signal strength may be given a weighted value of 0.75, the WAP with the third highest signal strength may be given a weighted value of 0.50, etc. For instance, equation 320 illustrates the location of end-user device 300 computed with a weighted average, where the weights are determined based on the ranking of the signal strength readings of WAP1, WAP2, and WAP3.

Many variations are possible and would be apparent to a person of ordinary skill in the art. As an example of yet another variation, the two visible WAPs with the strongest signal strengths may be given a weighted value of 1.0, or even an inflated value greater than 1.0, while the rest of the WAPs may be weighted linearly based on their ranking. The ranking of the signal strengths may be computed by sorting the signal strengths from high to low or from low to high. The ranking may then be based on the relative order of the signal strengths after sorting. In an embodiment, the user of the querying device may manually select the particular weighting method to use, i.e. signal strength vs. ranking vs. some other weighting method.

As a further embodiment, response times of the WAPs may be used in place of or in combination with signal strengths. For example, the querying device may send a single querying signal out to any WAPs within its range and then measure the amount of time required for each of the WAPs to respond to the querying signal. An assumption may then be made that the nearest WAP will response sooner than WAPs that are further away, and the first WAP to respond may be given a weighted value of 1.0 (or some other value), the second WAP to respond maybe given a weighted value of 0.75, etc. As with signals strengths, obstacles could cause delays in the response signals. In addition, different WAPs may have different response times due to latency associated with the electrical equipment within each WAP that may result in a WAP appearing to be closer or further away than is actually the case. When combining the response times with the signal strengths, the response times may be ranked, with a set of weight values based off the ranking of the response times. The weight for the location of each WAP may then be the product of the response time weight value and the signal strength. Additional factors may also be used in order to create compound weight values that result in the final weight value for a WAP.

Embodiments may also apply one or more functions to the detected signal strengths of visible WAPs prior to applying the weighted average analysis. As a first example, the signal strengths may be normalized to a value between 0 and 1. As a second example, if it was the case that the detected signal strengths were not linear relative to distance, then a function, such as the inverse-square law, may be applied to the signals prior to performing the weighted average analysis. Given a signal strength x, the modified value for the signal strength may be sqrt(1/x).

The database with the location readings and signal strength readings may be populated using various techniques. In a first embodiment, the database may be created organically using a combination of baseline scanning devices, end-user devices, and querying devices. From herein, "seeding device" may be used to refer to any device that is used to initially populate the database and to devices that are subsequently used to continue growing the database. It is also to be understood that while the database is described herein as containing location readings, signal strength readings, and identifier information for a plurality of WAPs, alternative embodiments of databases need not include all this information. For instance, a database may consist of only records of WAP identifiers and the location for each WAP. Therefore, a database need not be seeded with data from seeding devices, as any existing database including at least WAP identifiers and a location for each WAP may be used with embodiments described herein.

In one embodiment, the database may be populated with location information for visible wireless access points and organically grown using seeding devices and/or end-user devices. A seeding event on the seeding device may first be detected by the server 106 and the location of the seeding device thereafter determined Alternatively, the seeding devices may be configured to determine their location and to detect wireless signals. It is also possible for a seeding device with only wireless access (and without location functionality) to contribute identifier information to the database about a WAP, such as the MAC address and SSID. The actual location of the WAP may then be entered manually or may be determined automatically by using the weighted average analysis or the pattern recognition analysis. In an embodiment, a plurality of seeding devices may detect wireless signal strengths at particular locations, creating an association between a particular signal strength pattern at a particular location.

A seeding device may have both GPS and wireless capabilities allowing it to communicate with the locationing system to create location readings for visible WAPs. In one embodiment, whenever a user device (such as a smart phone) obtains a GPS readings, the user device may respond to this as a seeding event, which may the also cause the user device to detect WAP devices in range, enabling the user device to communicate both the GPS readings and the list of detected WAPs to the locationing system. As indicated above, the locationing system provides an interface that communicates with the database. In addition, the end user device may also communicate the detected signal strengths for the visible WAPs.

Mobile devices may use GPS information in response to various actions or seeding events performed in association with various applications. For example, when a user is performing an Internet search on his/her mobile device, the mobile device may use GPS information to tailor the search results based on the user's location. Similarly, if a user is using his/her mobile device to obtain navigational information to a driving destination, the mobile device may use GPS information to at least determine the user's starting location and provide a route to an end point. Thus, common use of end-user devices may be used to populate the database quickly and without requiring manual action from the user, and possibly without even the user's knowledge.

In an embodiment, a discrete agent may be installed on end-user devices having at least GPS and wireless capabilities to perform database seeding. The discrete agent may also be installed on devices having only GPS or having only wireless capabilities, but in such a case the discrete agent may not be used for seeding purposes. The discrete agent may query the GPS for seeding events, and turn on the wireless communication of the end-user device (if not already on) when a seeding event is detected. After recording the visible WAPs and their respective signal strengths, the discrete agent may determine the current GPS location of the user/seeding device and pair the current location of the device with the data recorded for the visible WAPs (signal strength and an identifier) to the database, where it can be stored for each of the WAPS. The discrete agent may also listen for other seeding events that can cause seeding to be initiated. Examples of events that can cause seeding to be initiated include changes in Cell Tower or Cell Tower signal strength, accelerometer changes, battery going on/off charge, visible Wi-Fi node changes, visible WAP changes, and GPS changes. In such a case, the discrete agent may make a GPS query as well as capture information associated with visible WAPs. This recorded information may subsequently be communicated to the database.

The discrete agent may also be programmed to communicate WAP location readings to the database on set time intervals or at a scheduled times. For example, the discrete agent may be programmed to make a GPS query and to temporarily turn on wireless communication to obtain a list of WAPs devices in range of the end-user device. Since the discrete agent may be programmed to gather information at various times, regardless of where the end-user device may be, the database may be populated as end-user devices move within many regions. Similarly, if the discrete agent is programmed to send information to the database whenever a GPS query is performed or whenever wireless communication is turned on, regardless of where the user or the device may be, the discrete agent may contribute valuable information that helps to populate the database.

The database may store location readings associated with WAPs. If a device detects a WAP having a signal strength of X and GPS coordinates of latitude A, longitude B, and altitude C, the corresponding record in the database for the WAP may indicate the signal strength X at coordinates (A, B, C). Whenever a WAP is detected by a device, location and signal strength readings may be added to the database. Thus, the database may maintain many signal strengths readings detected at various coordinates for a single WAP. In some embodiments, it may be desirable to also record the wireless channel and the security protocol used by the WAP.

Figure 4:
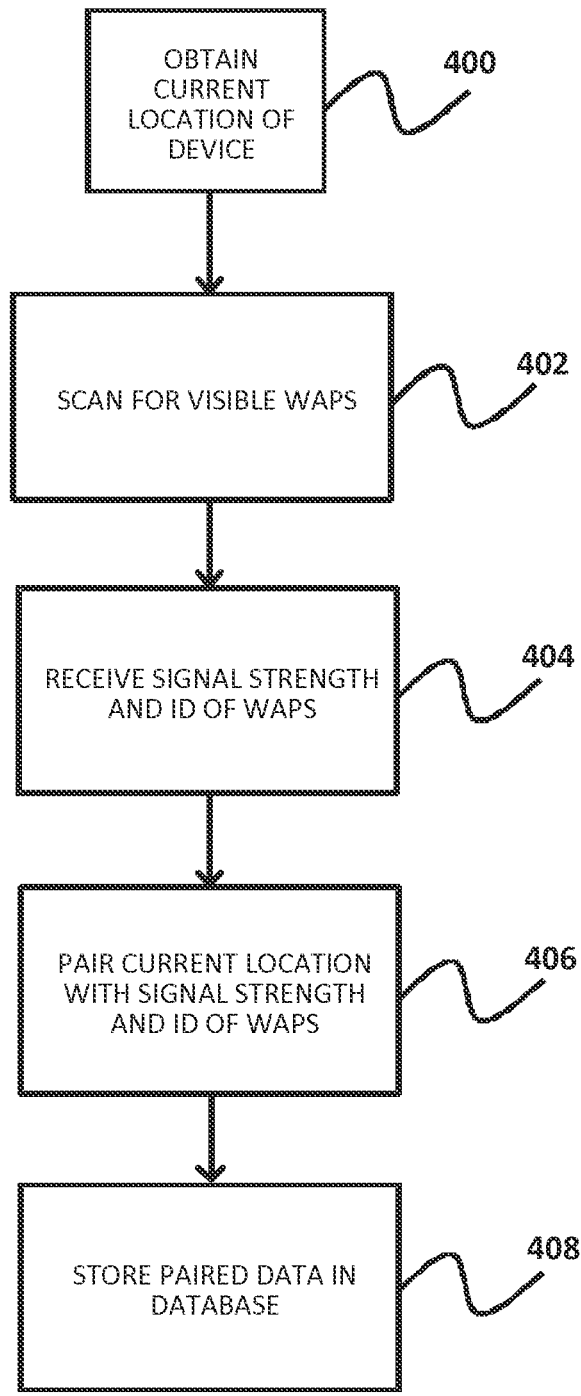
FIG. 4 is a flowchart illustrating an embodiment of steps involved with seeding a database in accordance with an embodiment.

FIG. 4 illustrates a flowchart of the steps that may be associated with the seeding of a database in accordance with an embodiment. In step 400, the seeding device may first determine its current location. The device may use GPS, cell-tower and/or Wi-Fi information to determine its current location. The device may also query the user of the seeding device to provide a geocode or a street address (which may be automatically converted to a geocode) representative of the current location of the seeding device. After obtaining the current location of the device, in step 402 the seeding device may scan wireless channels for visible WAPs. In step 404, the signal strength readings and identifier information for visible WAPs may be received. The data for the visible WAPs may be paired with the current location of the device in step 406, and this paired data may then be stored (in paired or unpaired form) in the database in step 408. For instance, if the current location of a device is (X1, Y1, Z1), and the detected signal strength for WAP1 is 80%, then the database stores that signal strength 80% of WAP1 was detected at location (X1, Y1, Z1). A plurality of such records may subsequently be used to determine the location of the WAP using the weighted average analysis, the pattern recognition analysis, or some other method. The ordering of steps 400 and 402 is not critical. For instance, the seeding device may first scan for visible WAPs and obtain signal strength readings, and after obtain its current location.

Figure 5:
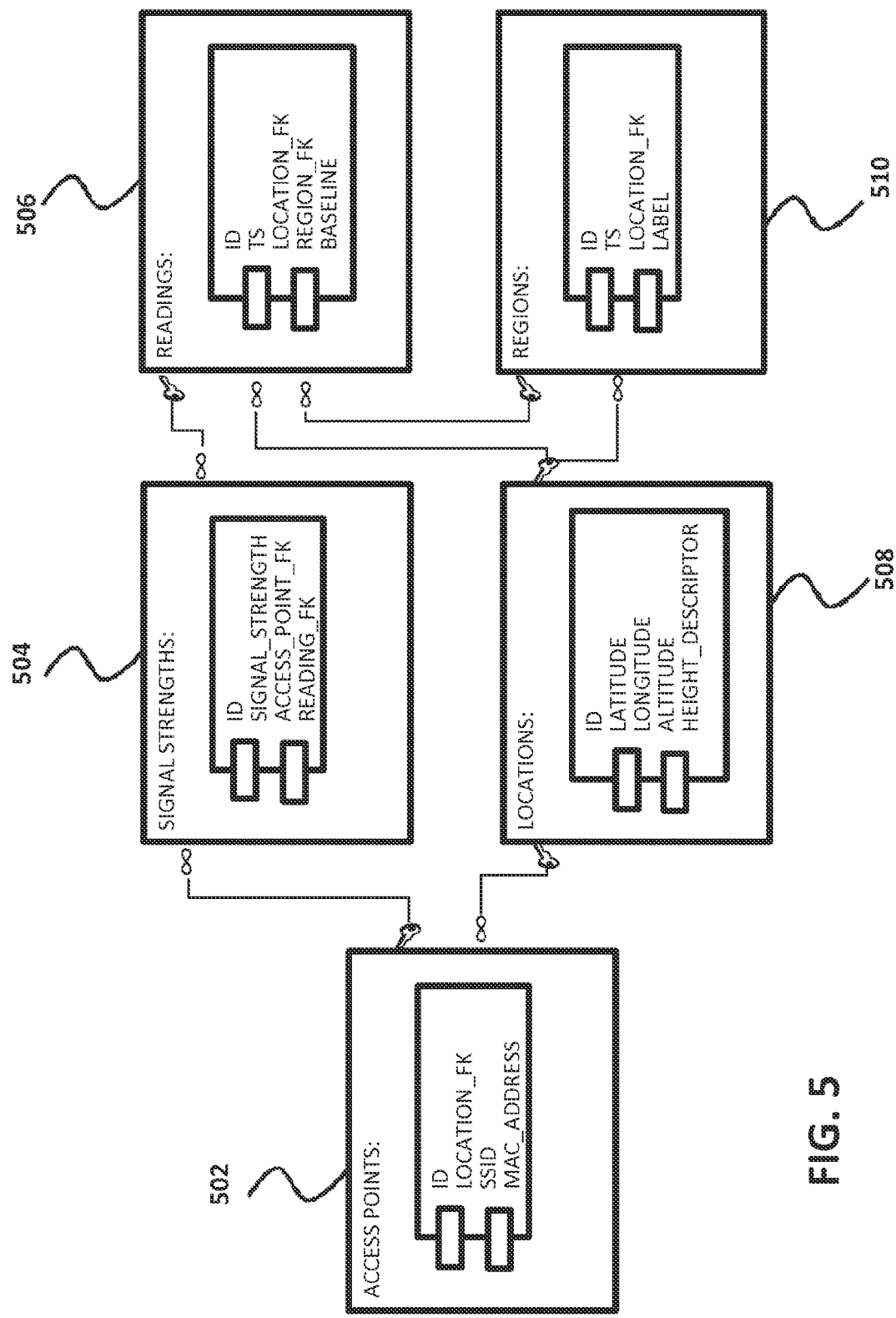
FIG. 5 illustrates an exemplary arrangement of a database to reduce redundant data entries.

The database could be organized in many other ways. For instance, the database can consist of a single table, where each record within the single table includes the SSID, the MAC address, the detected signal strength, and the GPS coordinates associated with the detected signal strength. FIG. 5 illustrates one particular arrangement of a database that may be organized into five tables, but this just illustrates one of many ways in which a database could be organized to reduce redundant data entries. The design and organization of databases is well known in the art.

Referring to FIG. 5, the access_points table 502 may store the information for a WAP, including the SSID and the MAC address. The access_points table may also include a foreign key to the locations table. The use of foreign keys in a database may enable cross-references between two tables. Thus, the use of the location_FK foreign key may enable the location information of the access points to be stored in a separate database while still being accessible via the cross-reference. While the database may include a table to store location information associated with a WAP, this is not required for the weighted average analysis or for the pattern recognition analysis.

The signal_strengths table 504 may store the signal strength, a cross-reference to the access point ID associated with the recorded signal strength, and a cross-reference to a record in the readings table. The readings table 506 may store the details of a particular reading, including the time that the reading was recorded, a cross-reference to a location record associated with the current reading, a cross-reference to a region record associated with the current reading, and a Boolean indicating whether the current reading is baseline data.

The locations table 508 may store coordinate data, including latitude, longitude, altitude, and a height descriptor. The locations table 508 may be used to store location data for access points or to store location data associated with the signal strength reading of an access point. Finally, the regions table 510 may store a label, a cross-reference to a location record associated with the current region, and the time that the region was first recorded.

Regions may be used to describe geographic areas that do not have a single set of coordinates associated with them. For instance, a region may be a room in a building, a set of rooms in a building, a hallway, an entire building, a particular outdoor area, etc. The regions table may include a cross-reference (location_FK) to the locations table to allow a specific location to be associated with the region. For instance, if a region is a building, then the entrance of the building may be recorded as the location of the region, or the coordinates near the center of the building can be recorded as the location. The label allows a textual description to be associated with the region. For instance, in an airport, the label for a particular region may be "terminal A." The value for the label may be specified manually by a user. Alternatively, if GPS coordinates are available, then the location entry may also be used as the label for the region. In addition, if a region is already known, additional location information may be given an existing label already associated with that region.

In embodiments of the weighted average analysis, when the position of a querying device is being computed, the device may turn on the wireless communication function to obtain a list of WAPs in range. The visible WAPs and their corresponding information may be stored in a list, an array, or in an alternative data structure or file. Each WAP in the list of visible WAPs may then be used as part of a query to search the database for location readings. If the database from FIG. 5 was being used, then the access_points table would be queried. The queries of tables can be done by searching for the MAC address, the SSID, or some other unique identifier. For every WAP match found in the database, the corresponding location coordinates may be used to determine the location of the querying device.

As the database is populated, a plurality of location coordinates or location readings may be associated with a single WAP. In one embodiment, the location associated with the highest signal strength stored in the database for a particular WAP may be used for the weighted average analysis. For instance, for a particular WAP, if signal strength X has been recorded at location A and signal strength Y has been recorded at location B, and X is greater than Y, then location A would be used in the weighted average analysis. In yet another embodiment, the location of a particular WAP may be computed using a weighted average of all the location readings in the database for the particular WAP. In the example above, locations A and B would be averaged together, with the coordinates of location A weighted by X, and the coordinates of location B weighted by Y.

Figure 6:
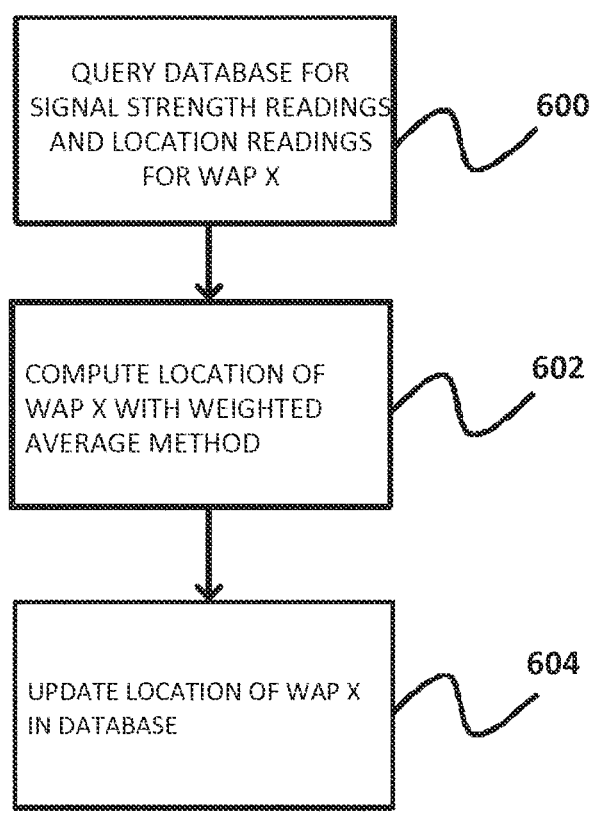
FIG. 6 is a flowchart illustrating an embodiment of steps involved with computing the location of a WAP based on signal strength readings and location readings received from a plurality of seeding devices.

FIG. 6 illustrates the main steps associated with a particular method for computing the location of a WAP based on signal strength readings and location readings received from a plurality of seeding devices. In step 600, the database may be queried to obtain signal strength readings and location readings for a particular WAP ("WAP X"). The location of the WAP may then be determined in step 602 using the weighted average analysis on the signal strength readings and location readings for WAP X. In step 604, the location of WAP X may be updated in the database with the result from the weighted average analysis. It is to be understood that a method other than the weighted average analysis can be used to determine the location of WAPs. For instance, the pattern recognition analysis or some other method may alternatively be used.

In reference to steps 600 and 602, only the locations with the n highest signal strengths may be used in the weighted average computation of a particular WAP. Alternatively, the locations of the signal strengths that are greater than a threshold may be used to compute a weighted average of the location of the WAP. It may also be possible to simply take the average of the locations with signal strengths greater than a threshold without doing any weighting. As can be appreciated, the weighted average analysis (and its variations) may be used to determine the location of a querying device, and similarly to determine the location of the WAPs in the database. It may also be possible to manually enter the location of a WAP. For instance, if the database is being edited or if the database is being populated manually, then the actual coordinates of WAPs can be entered by a user.

Similarly, only the locations with the n highest signal strengths may be used in the weighted average computation for an end-user device. In reference to FIG. 3, if the weighted average analysis is configured such that only the two highest signal strengths (n=2) are used for the weighted average computation, then only WAP1 302 and WAP2 304 would be used in the weighted average computation. Alternatively, only signal strength readings greater than a threshold may be used to compute the weighted average location for the end-user device. In further reference to FIG. 3, is the threshold was a signal strength greater than 10%, then WAP1 302, WAP2 304, and WAP3 306 would all be used for the weighted average computation. On the other hand, if the threshold was a signal strength greater than 50%, then only WAP1 302 and WAP2 304 would be used for the weighted average computation.

In yet another embodiment, pattern recognition may be used to determine the location of a querying device. Such pattern recognition embodiment may use the same database used for the weighted average analysis. Or, rather than record the coordinates (X, Y, Z) in the database for visible WAPs A and B, the database may simply indicate that WAPs A and B were visible in a particular region W, where W is a name or label that is descriptive or unique to that particular region. For instance, if such an embodiment is being used in an airport where GPS information is not available, then visible access points at various points within the airport can be recorded, with each of the various points assigned a name (Terminal A, Terminal B, etc.), rather than being assigned a set of GPS coordinates.

The pattern recognition analysis may be trained using the signal strength and region readings from the database. In one embodiment, a user traverses through one or more regions of interest, such as rooms, halls, a set of rooms, one or more floors within a building, one or more buildings, or one or more outdoor areas. As the user comes to a region of interest, the user can initiate a method that detects visible WAPs in range of the seeding device. The method compiles a list of visible WAPs and their respective signal strengths in the database. Finally, the user submits a name or label for the current region. Returning to the airport example, the user may stop at the entrance of Terminal A, and initiate the method to detect visible WAPs and their respective signal strengths. After the list of visible WAPs is compiled, the user can enter a name for the current region, such as "Terminal A," to be associated with the detected WAPs and their signal strengths. The data gathered may include the following: Terminal A; WAPs A, B, C; signal strengths 80%, 30%, 70%. The user can then proceed to record data from additional regions by repeating the process described.

One or more sets of readings may be associated with a particular region. The readings may also be taken from one or more points within the particular region. For example, if the region is a room, then readings may be recorded from each corner of the room.

In one embodiment, the process of recording visible WAPs and their respective signal strengths may consist of the user specifying the name for a region, followed by the user walking along the region with the seeding device, and ending with the user stopping the recording of visible WAPs and their respective signal strengths. For instance, the user may provide the name for a room, such as "Room A." The user may walk around the periphery of the room, or simply walk along a portion of the room, with the querying device recording readings every second, every two seconds, etc., or simply recording readings whenever there is a change in the signal strength detected for the WAPs. This may allow a single user to record a plurality of readings in a short period of time. The user may then proceed to another region and repeat the process.

In one embodiment, a user or an autonomous vehicle may gather a plurality of location readings by following a route or visiting a set of areas. The location readings may later be assigned to regions, either manually or automatically. For instance, the set of location readings may be displayed on a map, with the user having the option of discarding location readings or grouping a set of location readings as being representative of a region. A user may also manually draw an outline around a set of location readings, with the outline defining the region. Whenever additional location readings are received, the additional location readings may be assigned to the region based on the drawn outline.

The location readings may also be analyzed using a clustering algorithm, with the number of clusters defining the number of desired regions. Whenever additional location readings are added to the database, or after a minimum number of additional location readings have been added to a database, or based on a user initiating a retraining, the clustering algorithm may be rerun to create clusters from the larger location readings set.

The inputs of the pattern recognition analysis may be based on the number of unique WAPs recorded in the database, while the outputs of the pattern recognition analysis may be based on the number of regions recorded in the database. For example, if there have been a total of four WAPs detected during the seeding process, then the pattern recognition algorithm may accept at least four inputs. The pattern recognition algorithm may also include additional inputs to allow the pattern recognition algorithm to use additional features to determine the location of the querying device. If the user has provided data for three regions, then the pattern recognition algorithm may have at least three outputs. It is noted that it is also possible for the pattern recognition algorithm to have a single output whose value indicates the computed region. For example, the output may be a text label, such as "region 1". Alternatively, the output can be a number, with the number "1" representing a first region, the number "2" representing a second region, the number "3" representing a third region, etc.

In one embodiment, a neural network may be used as the pattern recognition algorithm. A neural network is a mathematical model that replicates how neurons and synapses within a biological neural network function. Through a series of learning exercises, a neural network can learn linear and non-linear relationships that yield a desired behavior or performance of the neural network based on certain inputs.

Figure 7:
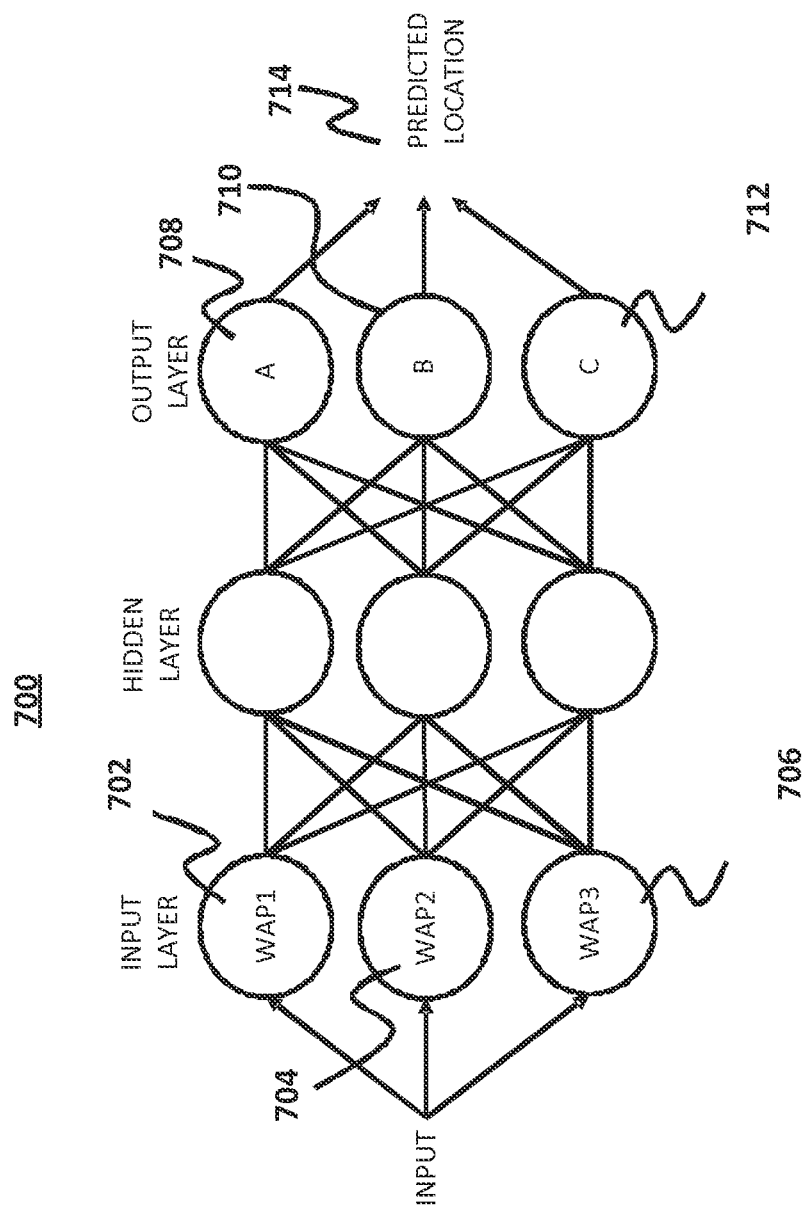
FIG. 7 illustrates an example of a neural network in accordance with an embodiment.

FIG. 7 illustrates an example of a neural network 700. Neural networks are comprised of neuron and synapses forming an interconnected assembly where neurons are linked to other neurons through synapses, each connection requiring one synapse. Weights are associated with synapses. A node within the neural network receives inputs from all of the synapses connected to the particular node, with the input from a particular synapse weighted by the weight associated with the particular synapse. An activation function may then be used to compute the output of the particular node based on the value of the inputs from the synapses. The output of the particular node may then be fed as the input to one or more nodes in the following layer of the neural network.

The neural network illustrated in FIG. 7 has one input layer, one hidden layer, and one output layer. All three layers have three nodes. However, the number of nodes in the layers of the neural network need not be the same. The number of input nodes may be based on the problem being solved and on the representation of the data used to train the neural network. The number of nodes in the hidden layer also depends on the problem being solved, and may also be determined empirically by analyzing how the performance of the neural network varies based on the number of nodes in the hidden layer. A larger number of nodes allow the neural network to come up with a more complex relationship between the inputs and outputs. However, a larger number of nodes can also hinder the performance of the neural network since the neural network may simply memorize the association between the input data and the output data rather than learn a relationship that extrapolates to data not seen during training.

The neural network 700 is fully connected, meaning that every node in a layer is connected to every node from the previous layer, and every node is connected to every node in the following layer. For example, the first node in the input layer is connected to each of the three nodes in the hidden layer. Similarly, the second node and the third node in the input layer are connected to each of the three nodes in the hidden layer. It is noted that embodiments are not limited to using a fully connected neural network. The actual architecture for the neural network used may be determined based on the number of inputs and through analysis of the performance of the neural network during the training phase. For instance, an alternative architecture for the neural network may include nodes in a first layer being connected to every other node in the following layer.

The number of hidden layers may also be varied to achieve the desired performance of the neural network. Embodiments of the neural network may also include recurrent links, where a node is connected to another node in the same layer or connected to a node in a previous layer.

In an embodiment, the inputs fed to the input layer of the neural network may be scaled between 0 and 1. However, the inputs can be scaled to any number range, or the inputs may simply be fed to the neural network without any scaling.

The number of output nodes may also be dependent on the problem being solved and on the desired performance. For instance, the neural network can have an output layer with a single node, where values between 0 and 0.10 indicate a first answer, values between 0.10 and 0.50 indicate a second answer, and values between 0.50 and 1.0 indicate a third answer. In this same example, the neural network can also have been comprised of an output layer with three nodes, with an output of 1-0-0 representing the first answer, an output of 0-1-0 representing the second answer, and an output of 0-0-1 representing the third answer.

Neural network 700 has an input layer consisting of three nodes: first input node 702, second input node 704, and third input node 706. The neural network 700 may be configured to determine the location of a querying device based on the signal strength readings of three WAPs: WAP1, WAP2, and WAP3. In reference to FIG. 3, the end-user device detects WAP1 with a signal strength of 80%, WAP2 with a signal strength of 90%, and WAP3 with a signal strength of 20%. The value of the first input node 702 may then be set to 0.8, the value of the second input node 704 would be set to 0.9, and the value third input node 706 would be set to 0.2. It is to be understood that regardless of how the inputs to neural network 700 are organized, what is key is for the inputs to be set consistently. For instance, setting the second input node 704 to the value of the signal strength of WAP1 would cause the neural network to learn erroneous patterns.

Neural network 700 has three nodes in the output layer: first output node 708, second output node 710, and third output node 712. These three output nodes are indicative of a predicted location of the querying device. For instance, the output nodes 708, 710, and 712 may represent the longitude, latitude, or longitude of the querying device. Alternatively, the three output nodes may represent the likelihood that user is in "Region A", "Region B", or "Region C".

The use and training of neural networks is well known in the art. However, the example below is presented to illustrate the process involved in training a neural network. The table below contains the bitwise AND operation. In the AND operation, if any of the inputs is 0, then the output is 0. The AND operation is equivalent to multiplication, where if a number is multiplied by 0, the result is 0. In the AND operation, the result is 1 only when all of the inputs are 1.

| Input | Desired Output |
|---|---|
| 0, 0 | 0 |
| 0, 1 | 0 |
| 1, 0 | 0 |
| 1, 1 | 1 |

A neural network being trained to learn the AND operation for two bits, would include two nodes in the input layer (one node for each input), and an output layer with one output node. The data from the table above is subsequently fed to the neural network over a number of iterations until the neural network reaches a desired performance level. When training the neural network, the neural network first receives as input the values 0 and 0. The output from the neural network initially may be very far from the desired output of 0. For instance, in the first iteration, the output produced by the neural network in response to receiving the inputs 0 and 0 may be 0.99. The actual output of the neural network is compared with the desired output, and the weights of the synapses of the neural network are updated to make the actual output of the neural network closer to the desired output. The actual synapses between the nodes in the neural network can also be updated (by deleting synapses or adding synapses) to make the actual output of the neural network closer to the desired output. It is to be understood that embodiments disclosed herein can use supervised learning methods, unsupervised learning methods, and semi-supervised learning methods. For example, a popular supervised learning method for neural networks is backpropagation.

In one embodiment, neuroevolution can be used to train neural networks. In neuroevolution, a population of neural networks is evolved using evolutionary techniques. For instance, a genetic algorithm can initially create a population of neural networks with random architectures and with random weight values for the synapses of the neural networks. Each neural network in the population is then tested with the training data, with the actual outputs produced by the neural network compared to the desired outputs to yield an error level. This error level can be used to assign a fitness or score for each neural network in the population. After each neural network has received a score, genetic operators such as crossover and mutation can be used to create a new population of neural networks, favoring the reproduction of neural networks that received higher scores during the training phase. This generational process can then be repeated for a fixed number of generations or until one or more neural networks with a desired performance level have been produced. Neuroevolution and genetic algorithms are methods well known in the art of pattern recognition and machine learning.

Embodiments of the pattern recognition analysis are not limited to the use of neural networks. Other pattern recognition analyses may be used, including classifier systems, clustering algorithms, regression algorithms, statistical models, and ensemble systems. Classifier systems include neural networks, decision trees, and support vector machines, among others. Clustering algorithms include K-means clustering, principal component analysis, among others.

Once a pattern recognition algorithm has been trained, the pattern recognition algorithm may be used to determine the location of a device based on the signal strengths of WAPs and/or response times of WAPs detected in the vicinity of the device. As indicated above, the pattern recognition algorithm may have a number of inputs equal to all of the WAPs which were part of the database during the training phase. For example, if a database had signal strength readings for three regions, but in all three regions the only WAP detected was WAP X, then the pattern recognition algorithm would have one input and three outputs. On the other hand, if the database had signal strength readings for three regions, with the signal strength readings associated with WAPs X, Y, and Z, then the pattern recognition would have at least three inputs (for each of the WAPs), and three outputs indicating the region that the user is in. As indicated above, the pattern recognition algorithm may have a single output whose value represents the region determined by the pattern recognition algorithm.

In embodiments where the pattern recognition algorithm uses an output for each of the possible regions that the querying device can be located, the output with the highest value may be selected as the determined region. For example, if a neural network has three outputs for regions A, B and C, and the output values are 0.5, 0.2, and 0.83 respectively, then the pattern recognition algorithm would determine that region C is where the querying device is located.

Figure 8:
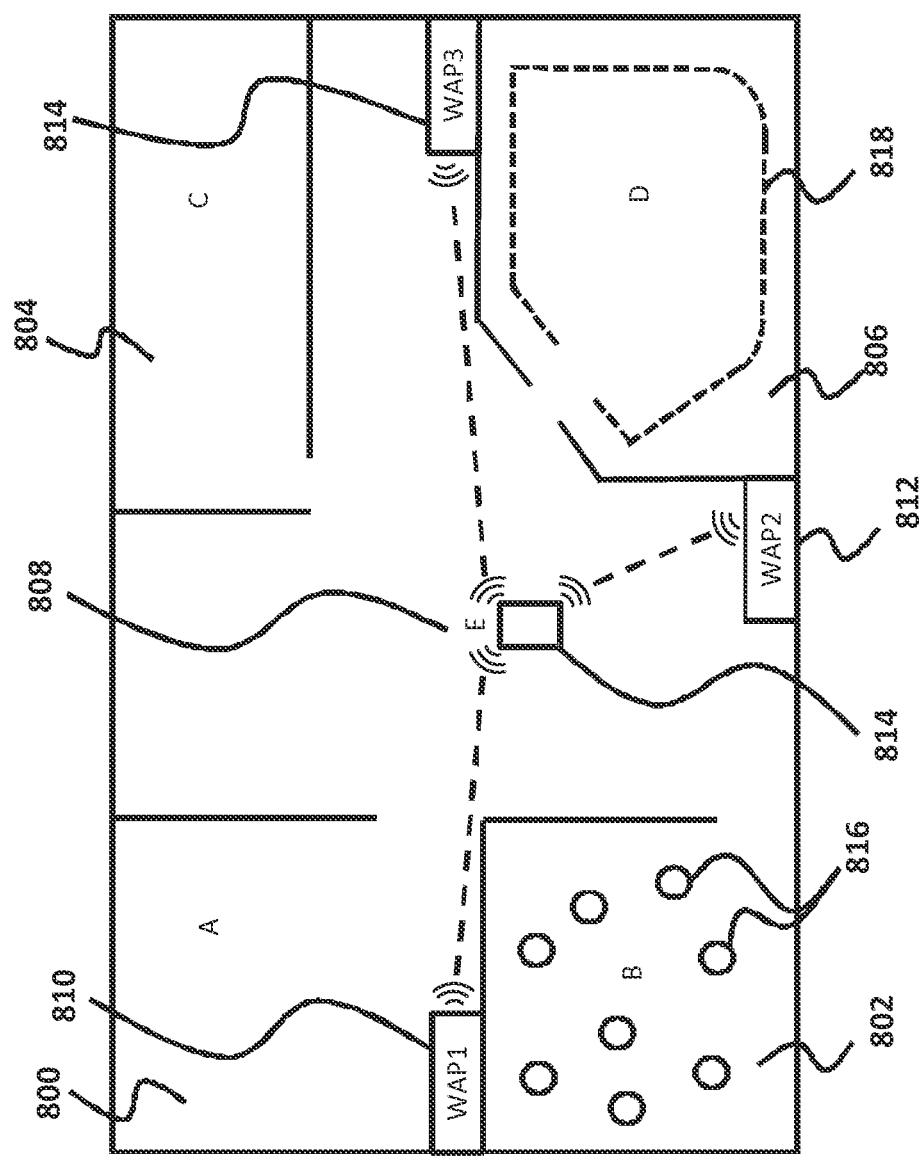
FIG. 8 illustrates a floor plan of a building in accordance with an embodiment.

FIG. 8 illustrates a floor plan of a building with five areas: area A 800, area B 802, area C 804, area D 806, and area E 808. This building includes three installed WAPs: WAP1 810, WAP2 812, and WAP3 814. A user with device 814 attempting to get his/her current location may scan wireless channels for visible WAPs. The figure illustrates the device 814 detecting WAPs 810, 812, and 814. The device 814 may feed these signal readings to a pattern recognition algorithm to determine where the device is located. The output of the pattern recognition algorithm may either be location coordinates, or an indication of the area where the user is located. For instance, the pattern recognition algorithm could indicate as its output that the user is located in area "E".

A user training the pattern recognition algorithm may start the process by traversing each of areas A-E, and recording the signals strengths of visible WAPs within those particular areas. For example, the user may walk into area A, and scan for visible WAPs to determine the signal strengths of WAPs when the user is in area A. The user may walk to the center of area A, or to some other location within area A, to determine the visible WAPs. All of the data gathered within area A may result in learning examples for the pattern recognition algorithm. The learning examples may consist of the signal strength readings of visible WAPs, with an indication that the expected output for those readings is area A. The goal may be to allow the pattern recognition algorithm to determine patterns of the signal strengths of visible WAPs when the user is in area A. For instance, the pattern recognition algorithm may learn the pattern that whenever the signal strength reading of WAP3 is greater than 90%, the user is in area A. The complexity of a pattern recognition algorithm enables it to learn linear and non-linear associations in order to detect patterns from the learning examples.

The user may then proceed to area B, repeating the process of scanning for visible WAPs. A user need not have the same number of learning examples for each area. For example, the user may stand in the middle of area A, obtain signal strength readings of visible WAPs, resulting in one learning example. The user may then proceed to area B, and obtain signal strength readings from various points within area B, resulting in a plurality of learning examples. For instance, points 816 indicate different points where a user could stand and obtain different signal strength readings. The user may then proceed to the other areas and similarly obtain signal strength readings. With learning examples for each area, the pattern recognition algorithm may be trained. After the training of the pattern recognition algorithm, if it was found that the pattern recognition algorithm does not accurately predict the location for a specific area, the user may then obtain additional signal strength readings for that particular area and retrain the pattern recognition algorithm. For instance, if it was found that having a single learning example for area A was not sufficient for enabling the pattern recognition algorithm to determine when the user was in area A, then the user may return to area A and get additional signal strength readings from one or more other points within area A.

As noted above, a user may start a process that automatically scans for visible WAPs and detects signal strength readings within an area. If two or more signal strength readings within an area are identical, then the duplicate signal strength readings may be discarded. As an example, a user may go to an area, such as area D, begin the automated process of recording visible WAPs and their signal strengths, and follow a route 818 (illustrated as a dashed line) through the area D. This would enable the user to gather a plurality of signal strength readings, and consequently generate a large set of learning examples, in a short period of time and without much effort. The user may only have to start the process, walk around the area, and then stop the process.

Embodiments may also combine the weighted average analysis and the pattern recognition analysis in various ways. In one embodiment, if the pattern recognition analysis provides a location of the querying device with a low confidence level, then the weighted average analysis may be used instead to provide the location of the querying device. In yet another embodiment, if the determination by the pattern recognition analysis takes longer than a specified period of time, then the pattern recognition analysis may be terminated, and the weighted average analysis may be used instead for the current location calculation. In addition, if the pattern recognition analysis crashes or is not able to finish the calculation of the location of the querying device due to an error, then the weighted average analysis may be used instead. When combining the weighted average analysis and the pattern recognition analysis, if either analysis times out, the location of the other analysis may be used instead.

In yet another embodiment, a plurality of pattern recognition analyses may be trained using the association of location/region readings and signal strength readings of WAPs. For instance, a neural network, a decision tree, and a support vector machine may be trained using a set of location/region readings and signal strength readings. Subsequently, whenever the location of a querying device is being determined, the determined location by the pattern recognition algorithm with the highest confidence level may be used as the final location of the querying device. If the neural network determined region A as the location of the querying device with a confidence level of 70%, if the decision tree determined region B as the location of the querying device with a confidence level of 80%, and if the support vector machine determined region C as the location of the querying device with a confidence level of 50%, then the location determined by the decision tree may be used as the location of the querying device. Alternatively, the region or location output the most often may be used as the final location. If the neural network and the decision tree output region A as the location of the querying device, and the support vector machine outputs region C as the location of the querying device, then region A may be used as the location of the querying device.

When using a plurality of pattern recognition algorithms in the location determination of the pattern recognition analysis, the outputs from the plurality of pattern recognition algorithms may also be weighted by an amount associated with a confidence level or with a level of preference. For instance, it may be determined after various training sessions that neural networks are the most accurate, and consequently the outputs from the neural networks may be weighted higher than the outputs of other pattern recognition algorithms. In addition, it is also possible for the outputs from the plurality of pattern recognition algorithms to be averaged or to be averaged using a weighted average, with the resulting average presented as the determined location of the querying device.

In yet another embodiment, when training a plurality of pattern recognition algorithms to be used in the pattern recognition method, it may be desirable to use only those pattern recognition algorithms that achieve an error level less a threshold during the training phase. Alternatively, after the plurality of pattern recognition algorithms have been trained, the pattern recognition algorithm that achieved the lowest error level may be used for determining the location of querying devices. The plurality of pattern recognition algorithms can also be trained using different subsets of data from the database, thus increasing the performance diversity of the pattern recognition algorithms.

It is to be understood that embodiments of the pattern recognition method are not limited to training a pattern recognition algorithm once. As the database of region/location readings and signal strength readings grows, the same pattern recognition algorithm may be retrained in order to increase the accuracy of the pattern recognition algorithm. If the accuracy of the new pattern recognition algorithm increases during training, then the old pattern recognition algorithm, currently being used in the pattern recognition method, may be replaced with the new pattern recognition algorithm. Alternatively, this replacement may take place after the accuracy of the new pattern recognition algorithm has increased by a threshold amount. A plurality of pattern recognition algorithms may be also be trained simultaneously. In this case, the pattern recognition algorithm achieving the highest accuracy, out of all the pattern recognition algorithms being trained, may replace the old and currently used pattern recognition algorithm in the pattern recognition method. As indicated above, during training the different pattern recognition algorithms may differ by type (neural network vs. support vector machine vs. an alternative algorithm), by architecture, by the subset of data used for training, the number of iterations used for training, etc.

An embodiment includes a computer-implemented method for seeding a database with location information from a plurality of visible transmitting devices, comprising the steps of: detecting a seeding event on a seeding device; determining a current location of the seeding device; using the seeding device to scan one or more radio frequencies for the plurality of visible transmitting devices; receiving a signal strength and an identifier for each visible transmitting device among the plurality of visible transmitting devices; pairing the current location with the signal strength and the identifier for each visible transmitting device to create the location information for each visible transmitting device; and storing in the database the current location, the signal strength and the identifier for each visible transmitting device.

As used herein, the term "mobile device" or "wireless device" refers to a device that may from time to time have a position that changes. Such changes in position may comprise changes to direction, distance, and/or orientation. In particular examples, a mobile or wireless device may comprise a cellular telephone, wireless communication device, user equipment, laptop computer, other personal communication system ("PCS") device, personal digital assistant ("PDA"), personal audio device ("PAD"), portable navigational device, or other portable communication devices. A mobile or wireless device may also comprise a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," and/or "for example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed. While the present disclosure illustrates and describes a preferred embodiment and several alternatives, it is to be understood that the techniques described herein can have a multitude of additional uses and applications. Accordingly, the invention should not be limited to just the particular description and various drawing figures contained in this specification that merely illustrate various embodiments and application of the principles of such embodiments.

What is claimed:

1. A computer-implemented method for seeding a database with location information from a plurality of visible transmitting devices, comprising the steps of:
   detecting a seeding event on a seeding device;
   determining a current location of the seeding device;
   using the seeding device to scan one or more radio frequencies for the plurality of visible transmitting devices;
   receiving a signal strength and an identifier for each visible transmitting device among the plurality of visible transmitting devices;
   using the identifier to query a database containing location points for a plurality of visible transmitting devices;
   for visible transmitting devices having location points within the database, performing a weighted average analysis of those location points for each identifier to determine an average of those location points for the identifier, resulting in a set of averages, wherein a weight assigned to each location point is based on the signal strength for the visible transmitting device corresponding to that location point;
   pairing the current location with the average and the identifier for each visible transmitting device to create the location information for each visible transmitting device; and
   storing in the database the current location, the average and the identifier for each visible transmitting device.

2. The method as recited in claim 1, wherein the identifier includes at least one of a media access control address, a service set identifier, or another unique identifier.

3. The method as recited in claim 1, wherein the seeding device is a location-aware device.

4. The method as recited in claim 1, wherein the seeding event is based on at least one of a GPS access, a change in a cell tower, a change in a cell tower signal strength, an accelerometer change, a battery being charged, a battering going off charge, a change in visible transmitting devices, and a change in the current location of the seeding device.

5. The method as recited in claim 1, wherein the method is performed on a set time interval or at a scheduled time.

6. A system for seeding a database with location information from a plurality of visible transmitting devices, comprising:
   a computer processor;
      a memory in communication with the computer processor when the system is activated, the memory comprising computer readable instructions that upon execution by the computer processor cause the system to detect a seeding event on a seeding device, determine a current location of the seeding device, use the seeding device to scan one or more radio frequencies for the plurality of visible transmitting devices, receive a signal strength and an identifier for each visible transmitting device among the plurality of visible transmitting devices, use the identifier to query a database containing location points for a plurality of visible transmitting devices, for visible transmitting devices having location points within the database, perform a weighted average analysis of those location points for each identifier to determine an average of those location points for the identifier, resulting in a set of averages, wherein a weight assigned to each location point is based on the signal strength for the visible transmitting device corresponding to that location point, pair the current location with the average and the identifier for each visible transmitting device to create the location information for each visible transmitting device, and store in a database of the memory the current location, the average and the identifier for each visible transmitting device.

7. The system as recited in claim 6, wherein the identifier includes at least one of a media access control address, a service set identifier, or another unique identifier.

8. The system as recited in claim 6, wherein the seeding device is a location-aware device.

9. The system as recited in claim 6, wherein the seeding event is based on at least one of a GPS access, a change in a cell tower, a change in a cell tower signal strength, an accelerometer change, a battery being charged, a battering going off charge, a change in visible transmitting devices, and a change in the current location of the seeding device.

10. The system as recited in claim 6, wherein the seeding device is used to scan the one or more radio frequencies on a set time interval or at a scheduled time.

* * * * *